(12) United States Patent
Shimada

(10) Patent No.: US 12,382,381 B2
(45) Date of Patent: Aug. 5, 2025

(54) CONNECTION DESTINATION SERVER SELECTION

(71) Applicant: NEC Corporation, Tokyo (JP)

(72) Inventor: Tsutomu Shimada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 381 days.

(21) Appl. No.: 17/889,486

(22) Filed: Aug. 17, 2022

(65) Prior Publication Data

US 2023/0067683 A1 Mar. 2, 2023

(30) Foreign Application Priority Data

Sep. 1, 2021 (JP) .................................. 2021-142352

(51) Int. Cl.
*H04W 48/18* (2009.01)
*H04W 72/56* (2023.01)
*H04W 24/08* (2009.01)

(52) U.S. Cl.
CPC ........... *H04W 48/18* (2013.01); *H04W 72/56* (2023.01); *H04W 24/08* (2013.01)

(58) Field of Classification Search
CPC ..... H04W 48/18; H04W 72/56; H04W 24/08; H04L 67/10; H04L 67/52; H04L 67/1008
See application file for complete search history.

(56) References Cited

U.S. PATENT DOCUMENTS

| 6,606,643 B1 * | 8/2003 | Emens ................... H04L 67/02 709/200 |
| 6,795,858 B1 * | 9/2004 | Jain ..................... H04L 67/1008 709/244 |
| 9,460,094 B1 * | 10/2016 | Nosack ................. H04W 4/029 |
| 2006/0155862 A1 * | 7/2006 | Kathi ...................... H04L 45/38 709/217 |
| 2009/0323543 A1 | 12/2009 | Shimakura |
| 2014/0185520 A1 * | 7/2014 | Gao ...................... H04W 64/00 370/328 |

(Continued)

FOREIGN PATENT DOCUMENTS

| CN | 101399713 A * | 4/2009 | |
| CN | 106453560 B * | 12/2019 | ......... H04L 67/1021 |

(Continued)

OTHER PUBLICATIONS

Alenazi et al., "NFV provisioning in large-scale distributed networks with minimum delay," IEEE Access, vol. 8, pp. 151753-151763, 2020 (Year: 2020).*

(Continued)

*Primary Examiner* — Shah M Rahman

(57) ABSTRACT

A communication control apparatus is configured to calculate a turnaround time per unit data amount between a server to be controlled and each of a plurality of servers including an other server, based on a required time from when the server to be controlled starts transmitting a signal to such other server until the server to be controlled receives a response to the signal from such other server, and a data size of the signal; determine, based on the turnaround time, a priority for selecting from among the plurality of servers a connection destination server to which the server to be controlled is to be connected; and select the connection destination server from among the plurality of servers based on the priority.

9 Claims, 9 Drawing Sheets

(56) References Cited

U.S. PATENT DOCUMENTS

| | | | | |
|---|---|---|---|---|
| 2015/0067819 | A1* | 3/2015 | Shribman | H04L 67/02 |
| | | | | 709/218 |
| 2017/0279725 | A1* | 9/2017 | Lee | H04L 47/193 |
| 2018/0107570 | A1* | 4/2018 | Hardy | G06F 11/3433 |
| 2018/0270302 | A1* | 9/2018 | Yang | H04L 67/1021 |
| 2019/0273957 | A1* | 9/2019 | Bohm | H04J 3/0667 |
| 2019/0342117 | A1* | 11/2019 | Lin | H04L 69/18 |
| 2020/0127916 | A1 | 4/2020 | Krishan | |
| 2021/0176301 | A1* | 6/2021 | Mutnuru | H04L 43/10 |
| 2021/0297327 | A1* | 9/2021 | Kumar | H04L 43/08 |
| 2022/0070648 | A1 | 3/2022 | Krishan | |
| 2022/0131945 | A1* | 4/2022 | Sapra | H04L 47/12 |

FOREIGN PATENT DOCUMENTS

| | | | |
|---|---|---|---|
| JP | 2010-035147 | A | 2/2010 |
| JP | 2016-181791 | A | 10/2016 |
| JP | 2023-540938 | A | 9/2023 |

OTHER PUBLICATIONS

Govindan et al., "Optimal server selection policy for improved network efficiency in smart phones," 2018 IEEE Wireless Communications and Networking Conference (WCNC), p. 6 p. , 2018. (Year: 2018).*

Carter et al., "Server Selection Using Dynamic Path Characterization in Wide-Area Networks", Proceedings of Infocom '97, Apr. 7-11, 1997, pp. 1014-1021 (Year: 1997).*

Hashim et al., "An Active Anycast RRT-Based Server Selection Technique", 2005 13th IEEE International Conference on Networks Jointly held with the 2005 IEEE 7th Malaysia International Conf on Communication, 2005 13th IEEE International Conference on, vol. 1, pp. 145-149 (Year: 2005).*

3GPP TS 23.501 V15.2.0 (Jun. 2018) Release 15 "System architecture for the 5G System (5GS)".

JP Office Communication for JP Application No. 2021-142352, mailed on May 7, 2025 with English Translation.

* cited by examiner

Fig. 6

| TIME STAMP | REQUIRED TIME | DATA SIZE | tTAT/bit | ... |
|---|---|---|---|---|
| 4 | 64mS | 16bit | 4mS/bit | ... |
| 3 | 120mS | 16bit | 7.5mS/bit | ... |
| 2 | 48mS | 16bit | 3mS/bit | ... |
| 1 | 80mS | 16bit | 5mS/bit | ... |
| ... | ... | ... | ... | ... |

| SERVER NAME | TRANSMISSION RATE |
|---|---|
| SERVER 3 | 4.875mS/bit |
| SERVER 4 | 6.7mS/bit |
| SERVER 5 | 3.2mS/bit |
| SERVER 6 | 5.984mS/bit |
| ... | ... |

CONNECTION DESTINATION SERVER SELECTION

CROSS-REFERENCES TO RELATED APPLICATION

The present application claims priority to Japanese patent application No. JP 2021-142352 filed on Sep. 1, 2021, the content of which is hereby incorporated by reference in its entirety.

BACKGROUND

Technical Field

The present disclosure relates to a communication control apparatus, a communication control method, and a communication control program.

Background Art

The 5th generation system architecture is defined in the technical standards in the 3rd Generation Partnership Project (3GPP). In the technical standards, a network function (NF) service provided by each NF of a control plane (C-Plane) of a 5th generation core network (5G core network (5GC)) is provided based on a concept of a service based architecture (SBA) (for example, refer to NPL 1).

Further, recent years have seen a widespread use of cloud computing (sometimes referred to as a "cloud" below), in which a plurality of servers provided in the same communication network perform processing in a distributed manner to provide services by using computer resources. In a case where a 5GC is configured by using a cloud, NFs that provide the same NF service can be provided in a plurality of servers in the cloud.

As a system for selecting an NF being a connection destination from among the plurality of NFs provided in the cloud, a procedure using the NF repository function (NRF) (sometimes referred to as an "NRF procedure" below) is defined in the technical standards. The NRF corresponds to an NF that makes a notification, based on a profile of a network function instance in a network, about the network function instance and an NF service provided by the network function instance. A server to be controlled can select a server to which the server to be controlled is to be connected, based on geographical location information or load information of connection destination candidate servers, according to the NRF procedure.

[NPL 1] 3GPP TS 23.501 version 15.2.0 Release 15 "System architecture for the 5G System (5GS)"

SUMMARY

For some implementation specifications of servers, geographical location information and load information are not open to the public in some cases. Such a case has an issue that selecting a server according to the NRF procedure does not result in selecting a server having a preferable communication condition as a connection destination server.

In addition, the communication performance of a communication network is affected by factors other than the geological location information and load information of a relevant server, such as the state of a communication path, the configuration of the server, and the state of the server. In other words, even if the server is close to a connection source server in terms of distance and is hence in a geographically superior position, the communication performance of the communication network deteriorates due to the influence of noise on the communication path and the like. Such a case has an issue that it is not possible, only by selection based on the geographical location information and load information of servers, to establish communication with a server having a preferable communication condition.

The present disclosure has been made to solve the above-described issues and has an example object of enabling establishment of communication with a server having preferable communication performance in a communication path in a control plane in a 5G core network.

According to the present disclosure, there is provided a communication control apparatus including one or more memories configured to store an instruction, and one or more processors configured to execute the instruction to calculate a turnaround time per unit data amount between a server to be controlled and each of a plurality of servers including an other server, based on a required time from when the server to be controlled starts transmitting a signal to the other server until the server to be controlled receives a response to the signal from the other server, and a data size of the signal; determine, based on the turnaround time, a priority for selecting from among the plurality of servers a connection destination server to which the server to be controlled is to be connected; and select the connection destination server from among the plurality of servers based on the priority.

According to the present disclosure, there is provided a communication control method including: calculating a turnaround time per unit data amount between a server to be controlled and each of a plurality of servers including an other server, based on a required time from when the server to be controlled starts transmitting a signal to the other server until the server to be controlled receives a response to the signal from the other server, and a data size of the signal; determining, based on the turnaround time, a priority for selecting from among the plurality of servers a connection destination server to which the server to be controlled is to be connected; and selecting the connection destination server from among the plurality of servers based on the priority.

According to the present disclosure, there is provided a non-transitory computer readable recording medium recording a program causing one or more processors to execute: calculating a turnaround time per unit data amount between a server to be controlled and each of a plurality of servers including an other server, based on a required time from when the server to be controlled starts transmitting a signal to the other server until the server to be controlled receives a response to the signal from the other server, and a data size of the signal; determining, based on the turnaround time, a priority for selecting from among the plurality of servers a connection destination server to which the server to be controlled is to be connected; and selecting the connection destination server from among the plurality of servers based on the priority.

According to the present disclosure, in a 5G core network, it is possible to establish communication with a server having preferable communication performance in a communication path in a control plane. Note that, according to the present disclosure, instead of or together with the above effect, other effects may be exerted.

BRIEF DESCRIPTION OF THE DRAWINGS

FIG. 6 is a data table illustrating examples of information on a turnaround time according to the first example embodiment;

FIG. 7 is a data table illustrating examples of information on a priority according to the first example embodiment;

DESCRIPTION OF THE EXAMPLE EMBODIMENTS

Figure 1:
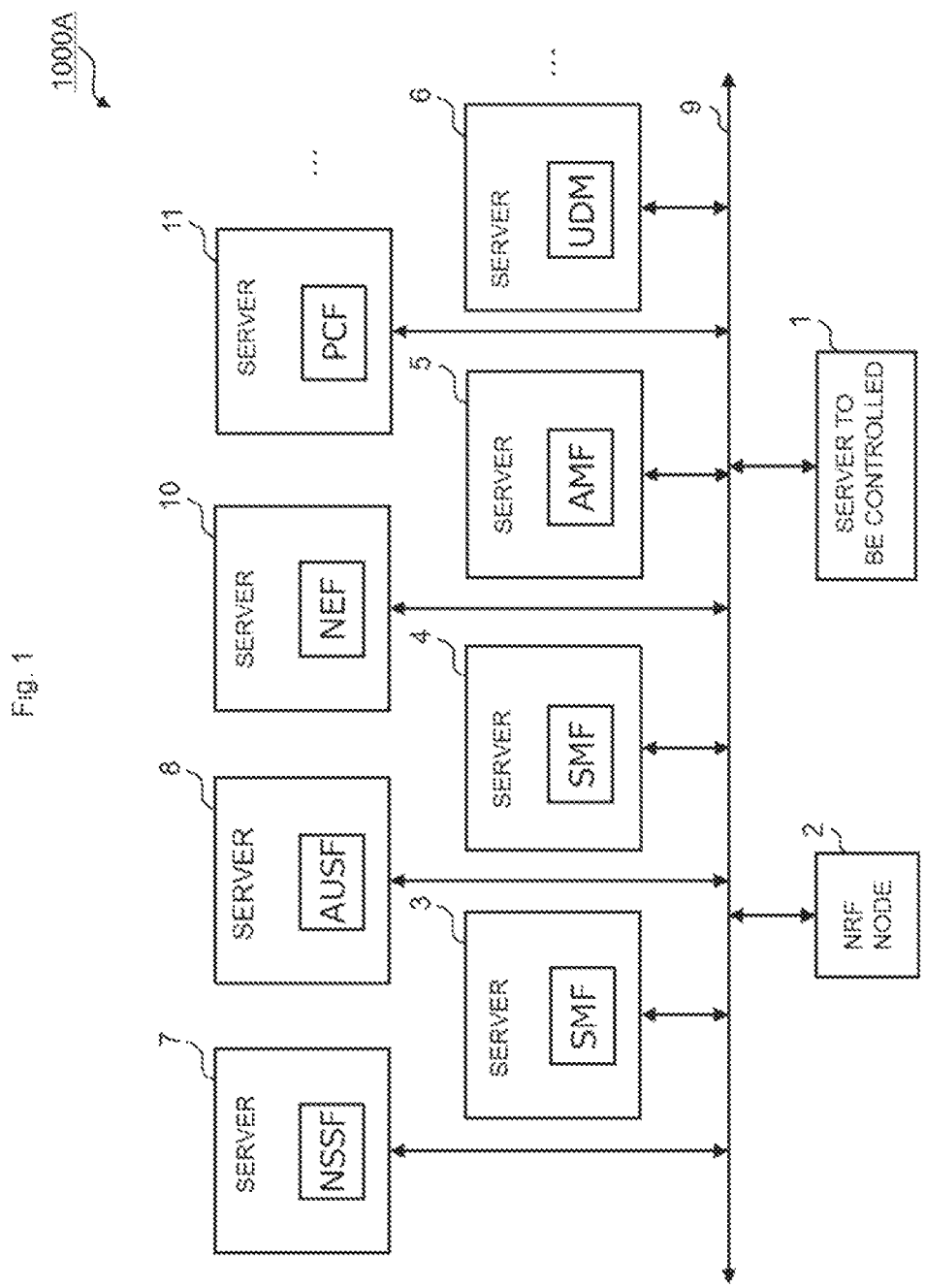
FIG. 1 is a diagram illustrating an operation configuration of a communication system according to a first example embodiment.

Hereinafter, example embodiments of the present disclosure will be described in detail with reference to the accompanying drawings. Note that, in the Specification and drawings, elements to which similar descriptions are applicable are denoted by the same or corresponding reference signs, and overlapping descriptions may hence be omitted.

Each example embodiment described below is merely an example of a configuration possible to implement the technique of the present disclosure. Modification or change can be appropriately made to each example embodiment below according to the configuration and various conditions of an apparatus to which the present disclosure is applied. It is not necessary that all the combinations of the elements included in each example embodiment below be essential for implementation of the present disclosure, and part of the elements can be appropriately omitted. Hence, the scope of the present disclosure is not intended to be restricted by the configuration described in each example embodiment below. Configurations obtained by combining a plurality of configurations described in the example embodiments can also be adopted as long as there is no mutual contradiction.

Descriptions will be given in the following order.
1. Overview of Example Embodiments of the Present Disclosure
2. First Example Embodiment
   2.1. Operation Configuration of Communication System
   2.2. Hardware Configuration of Information Processing Apparatus
   2.3. States of Communication Paths in Inter-server Communication
   2.4. Functional Configuration of Server to be Controlled (Communication Control Apparatus)
   2.5. Procedure of Processing in Server to be Controlled (Communication Control Apparatus)
   2.6. First Example Alteration
   2.7. Second Example Alteration
3. Second Example Embodiment
4. Other Example Embodiments

1. Overview of Example Embodiments of the Present Disclosure

First, an overview of example embodiments of the present disclosure will be described.

(1) Technical Issues

The 5th generation (5G) system architecture is defined in the technical standards in the 3rd Generation Partnership Project (3GPP). In the technical standards, a network function (NF) service provided by each NF of a control plane (C-Plane) of a 5th generation core network (5G core network (5GC)) is provided based on a concept of a service based architecture (SBA).

Further, recent years have seen a widespread use of cloud computing (sometimes referred to as a "cloud" below), in which a plurality of servers provided in the same communication network perform processing in a distributed manner to provide services by using computer resources. In a case where a 5GC is configured by using a cloud, NFs that provide the same NF service can be provided in a plurality of servers in the cloud.

As a system for selecting an NF being a connection destination from among the plurality of NFs provided in the cloud, a procedure using the NF repository function (NRF) (sometimes referred to as an "NRF procedure" below) is defined in the technical standards. The NRF corresponds to an NF that makes a notification, based on a profile of a network function instance in a network, about the network function instance and an NF service provided by the network function instance. A server to be controlled can select a server to which the server to be controlled is to be connected, based on geographical location information or load information of connection destination candidate servers, according to the NRF procedure.

For some implementation specifications of servers, geographical location information and load information are not open to the public in some cases. Such a case has an issue that selecting a server according to the NRF procedure does not result in selecting a server having a preferable communication condition as a connection destination server.

In addition, the communication performance of a communication network is affected by factors other than the geological location information and load information of a relevant server, such as the state of a communication path, the configuration of the server, and the state of the server. For example, even if the server is close to a connection source server in terms of distance and is hence in a geographically superior position, the communication performance of the communication network deteriorates when the communication path is affected by noise and the like. Such a case has an issue that it is not possible, only by selection based on the geographical location information and load information of servers, to select a server having a preferable communication condition as a connection destination server.

In view of the above circumferences, an example object is to enable establishment of communication with a server having preferable communication performance in a communication path in a control plane in a 5G core network.

(2) Technical Features

In the example embodiments of the present disclosure, for example, a communication control apparatus includes: a calculating section configured to calculate a turnaround time per unit data amount between a server to be controlled and each of a plurality of servers including an other server, based on a required time from when the server to be controlled starts transmitting a signal to the other server until the server to be controlled receives a response to the signal from the other server, and a data size of the signal; a determining section configured to determine, based on the turnaround time, a priority for selecting from among the plurality of servers a connection destination server to which the server to be controlled is to be connected; and a selecting section configured to select the connection destination server from among the plurality of servers based on the priority.

With this, in a 5G core network, it is possible to establish communication with a server having preferable communication performance in a communication path in a control plane in a 5G core network. Note that the above-described technical features are concrete examples of the example embodiments of the present disclosure, and the example embodiments of the present disclosure are, of course, not limited to the above-described technical features.

2. First Example Embodiment

<2.1. Operation Configuration of Communication System>

First, with reference to FIG. 1, an operation configuration of a communication system 1000A according to a first example embodiment of the present disclosure will be described. FIG. 1 is a diagram illustrating an example of the operation configuration of the communication system 1000A. The communication system 1000A may be provided by cloud computing (sometimes referred to as a "cloud" in the following description). The communication system 1000A may be implemented as a system for implementing a control plane in a 5G core network. In the present example embodiment, the communication system 1000A is assumed to be a system for implementing the control plane in the 5G core network by a cloud.

As illustrated in FIG. 1, the communication system 1000A is configured by a server 1 to be controlled, a network repository function (NRF) node 2, and servers 3, 4, 5, and 6 being connected to each other via a network 9. The server 1 to be controlled, the NRF node 2, and the servers 3, 4, 5, and 6 are each an information processing apparatus such as a server and include a common hardware configuration (refer to FIG. 2). In the present example embodiment, a description will be given of processing at the time of selecting, in the communication system 1000A, a server to which the server 1 to be controlled is to be connected.

The server 1 to be controlled is a server that provides, as a network function (NF), any of network functions included in the C-plane of the 5G core network, the network functions being defined in 3GPP TS 23.501, such as an access and mobility management function (AMF), a session management function (SMF), and unified data management (UDM).

The AMF is a network function that provides an NF service for performing access management and mobility management.

The SMF is a network function that provides an NF service for performing session management.

The UDM is a network function that provides an NF service for performing storing and management of subscriber contract information and authentication information for authentication.

The NRF node 2 is a server that provides an NRF for providing the function of finding a necessary NF service from among the network functions of the C-plane of the 5G core network. The NRF node 2 makes a notification, based on a profile of the network function instance in the network, about the network function instance and an NF service provided by the network function instance through an NRF procedure. The server 1 to be controlled can obtain geographical location information or load information of connection destination candidate servers, based on the information notified by the NRF node 2.

The server 3 is a server that provides the SMF among the network functions included in the C-plane of the 5G core network. The server 4 is a server that provides the SMF among the network functions included in the C-plane of the 5G core network. The server 5 is a server that provides the AMF among the network functions included in the C-plane of the 5G core network. The server 6 is a server that provides the UDM among the network functions of the C-plane of the 5G core network.

A server 7 is a server that provides network slice selection functions (NSSFs), each of which is a network function of selecting a combination of network slice instances to provide a service to a user terminal (user equipment (UE)) connected to the communication system 1000A and thereby determining an AMF to use, in the C-plane of the 5G core network. A server 8 is a server that provides an authentication server function (AUSF), which is a network function playing the function of UE authentication, in the C-plane of the 5G core network.

A server 10 is a server that provides a network exposure function (NEF) among the network functions of the C-plane of the 5G core network. A server 11 is a server that provides a policy control function (PCF) among the network functions of the C-plane of the 5G core network. Note that the communication system 1000A may be configured by including a server(s) other than those illustrated in FIG. 1.

As described above, in the communication system 1000A, the network functions of the C-plane of the 5G core network are implemented in a distributed manner by the server 1 to be controlled, the NRF node 2, and the servers 3, 4, 5, 6, 7, 8, 10, and 11 provided in the cloud.

<2.2. Hardware Configuration of Information Processing Apparatus>

Figure 2:
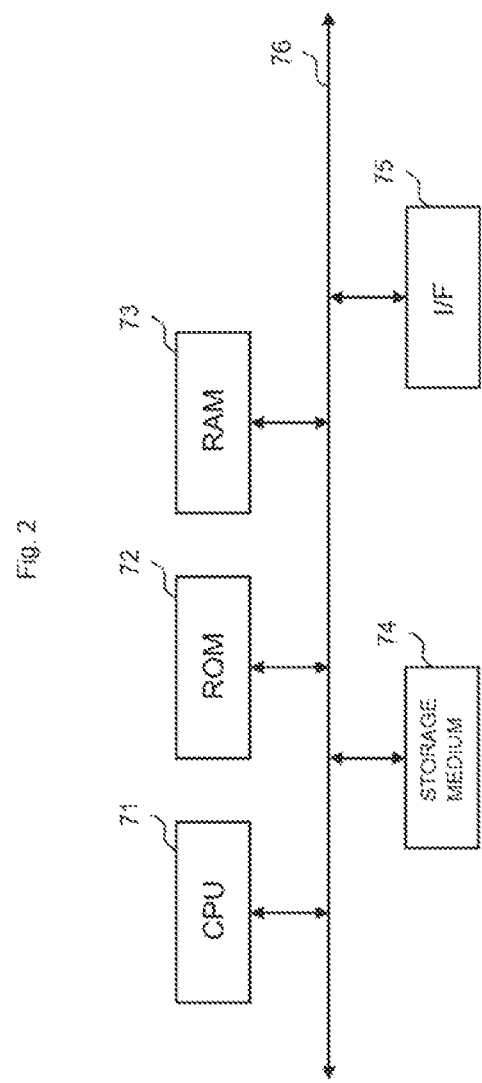
FIG. 2 is a block diagram illustrating a hardware configuration of an information processing apparatus according to the first example embodiment.

Next, a hardware configuration of information processing apparatuses, such as the server 1 to be controlled, the NRF node 2, and the servers 3, 4, 5, 6, 7, 8, 10, and 11, according to the present example embodiment will be described. FIG. 2 is a block diagram illustrating the hardware configuration of such an information processing apparatus.

In the information processing apparatus, a central processing unit (CPU) 71, a read only memory (ROM) 72, a random access memory (RAM) 73, a storage medium 74, and an interface (I/F) 75 are connected to each other through a bus 76. Note that the information processing apparatus may include, other than components illustrated in FIG. 2, an input apparatus, such as a keyboard and a mouse, or a display apparatus, such as a display.

The CPU 71 is a computing means and controls operation of the entire information processing apparatus. The RAM 73 is a volatile storage medium that is capable of high-speed reading and writing of information and is used as a work space for the CPU 71 to process information. The ROM 72 is a nonvolatile read-only storage medium and stores therein programs such as firmware. The storage medium 74 is a nonvolatile storage medium capable of reading and writing of information, such as a hard disk drive (HDD), and stores therein an OS, various control programs, application programs, and the like.

The I/F 75 connects the bus 76 and various pieces of hardware for control. The information processing apparatus is connected to the network 9 (refer to FIG. 1) through the I/F 75.

With such a hardware configuration, the CPU 71 performs computing in accordance with any of the programs stored in the ROM 72 or a program loaded from the storage medium 74 into the RAM 73, to configure a software control section of the server 1 to be controlled. A combination of the software control section configured as described above and hardware configures functional blocks that implement functions of a controller 100 (refer to FIG. 4).

<2.3. States of Communication Paths in Inter-Server Communication>

Figure 3:
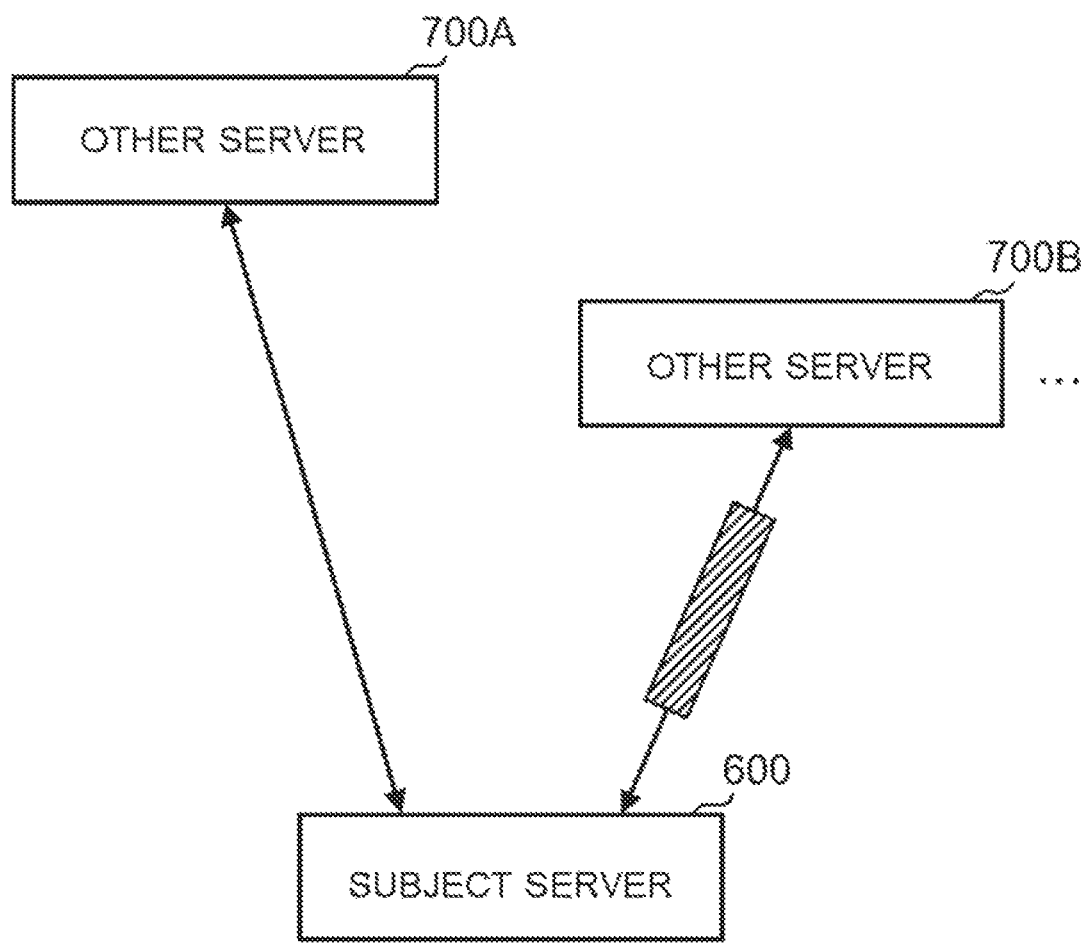
FIG. 3 is an explanatory diagram for describing states of communication paths in inter-server communication as a reference example.

Next, states of communication paths in inter-server communication will be described with reference to FIG. 3. FIG. 3 is an explanatory diagram for describing states of communication paths in inter-server communication as a reference example. With reference to FIG. 3, a state of a communication path at the time when a subject server 600 communicates with an other server 700A or an other server 700B is described. With reference to FIG. 3, description is given by assuming that the geological distance between the subject server 600 and such other server 700B is shorter than the geological distance between the subject server 600 and such other server 700A.

In 3GPP, a system for obtaining geological location information or load information of connection destination candidate servers to select a connection destination server according to the above-described NRF procedure is defined.

For example, as illustrated in FIG. 3, assume that the subject server 600 to be controlled communicates with such other server 700A or such other server 700B. In a case where the subject server 600 selects a server to which the subject server 600 is to be connected according to the NRF procedure, such other server 700B is selected as a connection destination server of the subject server 600 since the geological distance between the subject server 600 and such other server 700B is shorter than the geological distance between the subject server 600 and such other server 700A as described above.

However, the communication performance of a communication network is affected by factors other than the geological location information and load information of a relevant server, such as the state of a communication path, the configuration of the server, and the state of the server. For example, even though such other server 700B is in a geographically superior position with the distance from the subject server 600, which is the connection source server, being shorter than the distance between the subject server 600 and such other server 700A, the communication path between the subject server 600 and such other server 700B is affected by noise and the like in some cases as illustrated in FIG. 3.

In FIG. 3, the influence of noise and the like on the communication path between the subject server 600 and such other server 700B is illustrated as a hatched region. The communication performance of the communication network in the communication path between the subject server 600 and such other server 700B deteriorates due to the influence of the noise and the like on the communication path. In such a case, it is not possible, only by selection based on the geographical location information and load information of servers as in the NRF procedure, to select a server (for example, such other server 700A or the like) having a preferable communication condition as a connection destination server.

To address such an issue, in the present example embodiment, it is made possible to reflect actual communication performance of communication paths in inter-server communication and thereby select a server having a preferable communication condition as a connection destination server.

<2.4. Functional Configuration of Server to be Controlled (Communication Control Apparatus)>

Figure 4:
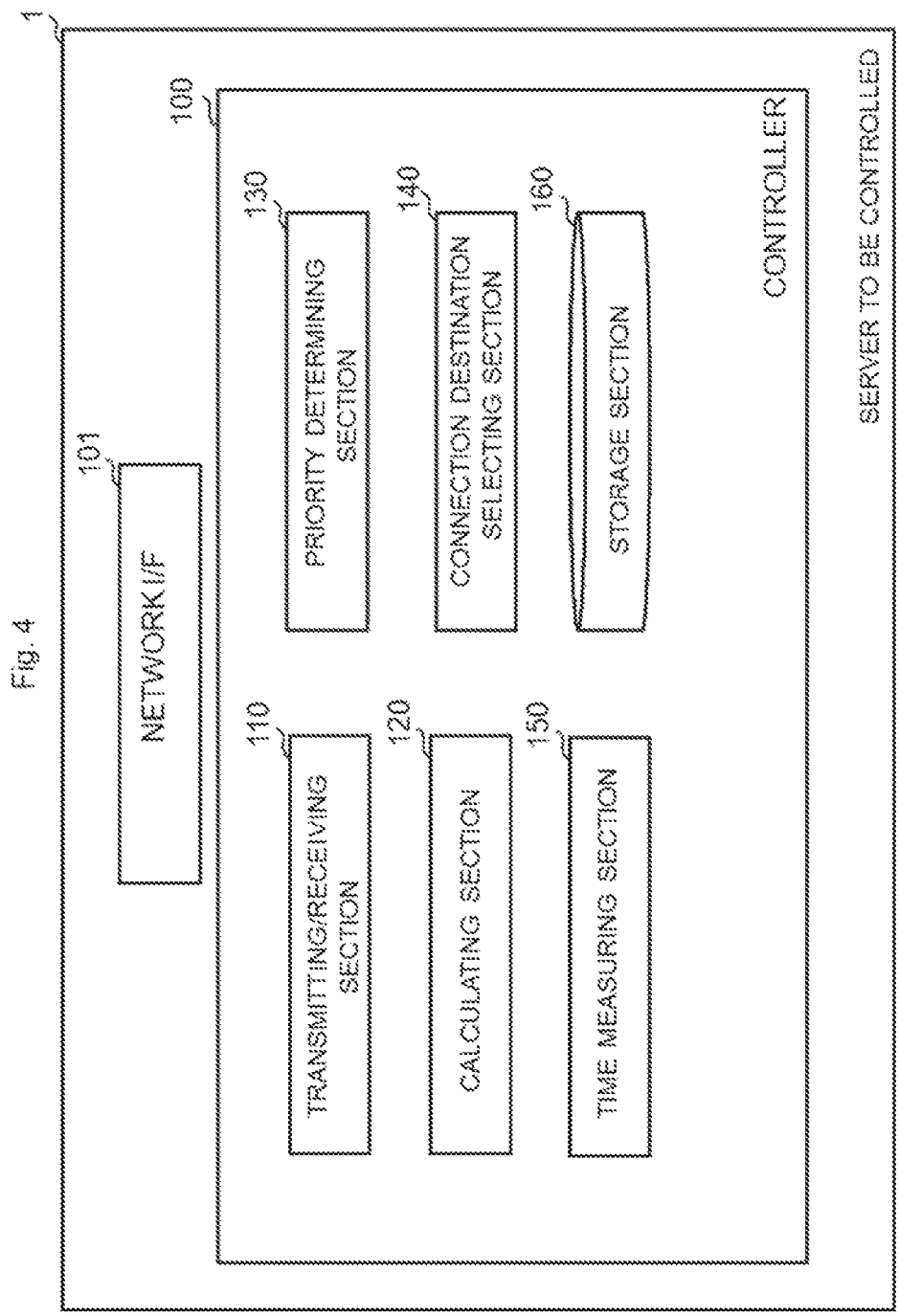
FIG. 4 is a functional block diagram illustrating a functional configuration of a server to be controlled according to the first example embodiment.

Next, with reference to FIG. 4, a functional configuration of the server 1 to be controlled is described. FIG. 4 is a functional block diagram illustrating a functional configuration of the server 1 to be controlled. As illustrated in FIG. 4, the server 1 to be controlled includes a controller 100 and a network I/F 101, which is an interface for the controller 100 to exchange information with other equipment via the network 9.

When the server 1 to be controlled performs communication, the controller 100 controls selection of an information processing apparatus to which the server 1 to be controlled is to be connected and the like. The controller 100 is implemented by a dedicated software program being installed in the information processing apparatus such as the server 1 to be controlled. The controller 100 includes a transmitting/receiving section 110, a calculating section 120, a priority determining section 130, a connection destination selecting section 140, a time measuring section 150, and a storage section 160.

The transmitting/receiving section 110 transmits/receives a signal to and from each connection destination server. For example, in a case where the servers 3, 4, 5, 6, 7, 8, 10, and 11 are connection destination candidate servers of the server 1 to be controlled, the transmitting/receiving section 110 transmits a signal to each of the servers 3, 4, 5, 6, 7, 8, 10, and 11 via the network I/F 101. The transmitting/receiving section 110 then receives a response signal from each of the servers 3, 4, 5, 6, 7, 8, 10, and 11 via the network I/F 101.

The calculating section 120 calculates a turnaround time, based on a data size of the signal transmitted/received between the transmitting/receiving section 110 and each information processing apparatus, such as the server 3, 4, 5, 6, 7, 8, 10, or 11, and a required time taken for the transmission/reception of the signal. In a case of assuming that the time from when the transmitting/receiving section 110 starts transmitting the signal to each of the servers 3, 4, 5, 6, 7, 8, 10, and 11 until the transmitting/receiving section 110 receives a response to the transmitted signal is the required time, the calculating section 120 calculates a turnaround time per unit data amount, based on the data size of a signal transmitted/received to/from the transmitting/receiving section 110 and the required time, for example. Information on the turnaround time calculated by the calculating section 120 is stored in the storage section 160.

The priority determining section 130 determines a priority for selecting a server to which the server 1 to be controlled is to be connected, based on the turnaround time per unit data amount calculated by the calculating section 120. The priority determining section 130 is an example of a determining section of the present example embodiment. Information on the priority determined by the priority determining section 130 is stored in the storage section 160.

The connection destination selecting section 140 selects a server to which the server 1 to be controlled is to be connected, based on the priority determined by the priority determining section 130. The connection destination selecting section 140 is an example of a selecting section of the present example embodiment.

The time measuring section 150 measures, as the required time, the time from when the transmitting/receiving section 110 starts transmitting the signal to each of the servers 3, 4, 5, 6, 7, 8, 10, and 11 until the transmitting/receiving section 110 receives the response to the transmitted signal, for example.

The storage section 160 is a storage region implemented by the storage medium 74 or the like of the server 1 to be controlled and stores the information on the turnaround time calculated by the calculating section 120, the information on the priority determined by the priority determining section 130, and the like.

<2.5. Procedure of Processing in Server to be Controlled (Communication Control Apparatus)>

Figure 5:
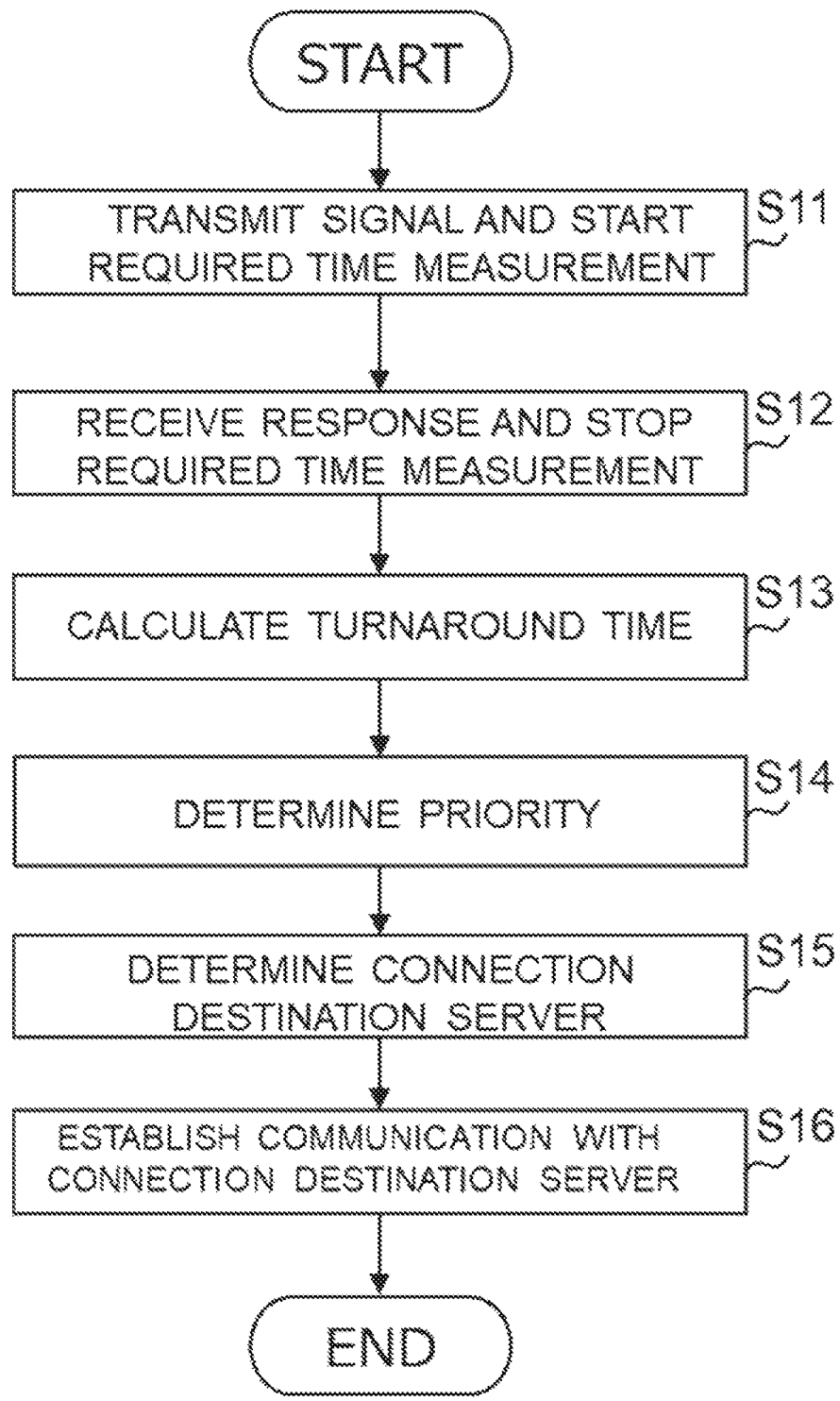
FIG. 5 is a flowchart illustrating a procedure of processing until communication with a connection destination server is established according to the first example embodiment.

Next, with reference to FIGS. 5 to 7, a description will be given of a procedure of processing in the server 1 to be controlled, until communication with a server being a connection destination is established. FIG. 5 is a flowchart illustrating a procedure of processing until communication with a connection destination server is established in the server 1 to be controlled. FIG. 6 is a data table illustrating examples of information on a turnaround time. FIG. 7 is a data table illustrating examples of information on to a priority. A description of FIG. 5 is given by assuming that the servers 3, 4, 5, and 6 are connection destination candidate servers of the server 1 to be controlled.

In step S11, the transmitting/receiving section 110 transmits a signal to each of the servers 3, 4, 5, and 6. The time measuring section 150 starts measuring the required time at the same time when the transmitting/receiving section 110 starts transmitting the signal. Note that the server 3 is an example of a first server of the present example embodiment.

In step S12, the transmitting/receiving section 110 receives a response signal from each of the servers 3, 4, 5, and 6. The time measuring section 150 stops measuring the required time at the timing when the transmitting/receiving section 110 receives the signal.

In step S13, the calculating section 120 calculates a turnaround time per unit data amount between the server 1 to be controlled and each of the servers 3, 4, 5, and 6. In step S13, the calculating section 120 calculates the turnaround time per unit data amount, based on a data size of the signal transmitted/received by the transmitting/receiving section 110 to/from each information processing apparatus, such as the server 3, 4, 5, or 6, and the required time taken for the transmission and reception of the signal.

FIG. 6 is a data table 300 illustrating examples of a turnaround time per unit data amount between the server 1 to be controlled and the server 3. As illustrated in FIG. 6, the transmitting/receiving section 110 transmits a signal to a connection destination server (the server 3 in FIG. 6) at a predetermined interval.

At time stamp "1" in the data table 300, it is illustrated that the turnaround time (tTAT/bit) per unit data amount is 5 mS/bit in a case where the required time when a signal with a data size of 16 bits is transmitted/received to/from the server 3 is 80 mS (seconds).

At time stamp "2" in the data table 300, it is illustrated that the turnaround time (tTAT/bit) per unit data amount is 3 mS/bit in a case where the required time when a signal with a data size of 16 bits is transmitted/received to/from the server 3 is 48 mS (seconds).

At time stamp "3" in the data table 300, it is illustrated that the turnaround time (tTAT/bit) per unit data amount is 7.5 mS/bit in a case where the required time when a signal with a data size of 16 bits is transmitted/received to/from the server 3 is 120 mS (seconds).

At time stamp "4" in the data table 300, it is illustrated that the turnaround time (tTAT/bit) per unit data amount is 4 mS/bit in a case where the required time when a signal with a data size of 16 bits is transmitted/received to/from the server 3 is 64 mS (seconds).

In a case where the transmitting/receiving section 110 transmits/receives a signal to/from the connection destination candidate server a plurality of times, the calculating section 120 may calculate a simple average of turnaround times (tTAT/bit) per unit data amount in the plurality of transmissions/receptions of a signal to/from the connection destination candidate server. The calculating section 120 calculates that the simple average of the turnaround times per unit data amount between the server 1 to be controlled and the server 3 is 4.875 mS/bit, based on the data table 300 in FIG. 6, for example.

In step S14, the priority determining section 130 determines priorities for selecting a server to which the server 1 to be controlled is to be connected, based on the turnaround times per unit data amount calculated by the calculating section 120. FIG. 7 is a diagram illustrating an example of a priority data table 500 in which priorities for selecting a server to which the server 1 to be controlled is to be connected are determined.

Note that FIG. 7 illustrates, for each of the servers 3, 4, 5, and 6, the simple average of turnaround times (tTAT/bit) per unit data amount over a plurality of transmissions/receptions of a signal between the corresponding one of the servers 3, 4, 5, and 6 and the server 1 to be controlled (time stamps 1 to 4, refer to FIG. 6), as a transmission rate. Also for the servers 7, 8, 10, and 11, similarly to the server 3, the simple average of turnaround times (tTAT/bit) per unit data amount over the plurality of transmissions/receptions of a signal to/from the server 1 to be controlled may be used as the transmission rate. Alternatively, turnaround times (tTAT/bit) per unit data amount in transmissions/receptions of a signal to/from the server 1 to be controlled are calculated within a predetermined time period from a current time point, and the simple average of the calculated turnaround times per unit data amount may be used as the transmission rate.

The priority determining section 130 determines, based on the priority data table 500, priorities so as to select a server (connection destination server) to which the server 1 to be controlled is to be connected, in ascending order of transmission rate, for example. In FIG. 7, the priority determining section 130 determines priorities so as to select a server to which the server 1 to be controlled is to be connected, in the order of the server 5, the server 3, the server 6, and then the server 4, for example.

Note that, when the server 1 to be controlled has a failure in a case where the server 1 to be controlled is a server that provides the SMF, the priority determining section 130 determines priorities so as to select the server that provides a network function corresponding to the SMF, as a connection destination candidate server, based on the transmission rates of the servers illustrated in the priority data table 500.

With reference to FIG. 1, the server 3 and the server 4 are each a network node that provides the SMF. Hence, the server 3 and the server 4 each correspond to a server that provides the same network function as that of the server 1 to be controlled. In such a case, the priority determining section 130 determines, regarding the server 3 and the server 4, priorities so as to select a server to which the server 1 to be controlled is to be connected in ascending order of transmission rate, specifically, the order of the server 3 and then the server 4, for example.

As described above, priorities may be determined so as to select a server to which the server 1 to be controlled is to be connected, from among a plurality of servers that can provide a network function requested by the server 1 to be controlled. In this case, the connection destination candidate servers (for example, the server 3 and the server 4) of the server 1 to be controlled each provide the same network function as the network function (for example, the SMF) requested by the server 1 to be controlled.

Note that a "server that can provide a network function requested by the server 1 to be controlled" corresponds to a server that can provide the same network function as the network function provided by the server 1 to be controlled, for example.

Alternatively, for example, the "server that can provide a network function requested by the server 1 to be controlled" corresponds to a server that can provide a network function corresponding to the network function provided by the server 1 to be controlled in a case where the server 1 to be controlled is to transmit a signal to a specific server by using the network function provided by the server 1 to be controlled. Specifically, in a case where the server 1 to be controlled is a server that provides the SMF and performs processing of reading subscriber information, a server that can provide the UDM corresponds to an example of the "server that can provide a network function requested by the server 1 to be controlled".

Then, in step S15, the connection destination selecting section 140 selects a server to which the server 1 to be controlled is to be connected, based on the priorities determined by the priority determining section 130. For example, in a case where the priorities are determined so as to select a server to which the server 1 to be controlled is to be connected in the order of the server 5, the server 3, the server 6, and then server 4, the connection destination selecting section 140 selects, as the connection destination server of the server 1 to be controlled, the server with the smallest transmission rate, in other words, the server 5 with the shortest turnaround time.

Next, in step S16, the network I/F 101 establishes communication with the server 5 selected as the connection destination server in step S15 and terminates this processing.

As described above, in the present example embodiment, the server 1 to be controlled can select a server to which the server 1 to be controlled is to be connected, based on the actual communication quality of the transmission paths of the servers (for example, the servers 3, 4, 5, 6, . . . ) included in the communication system 1000A. With this configuration, the server 1 to be controlled can establish communication with a server having preferable communication performance in a communication path in the control plane in the 5G core network.

Note that the configuration of the present example embodiment can also be applied to a communication system including a plurality of servers that do not correspond to the control plane of the 5G core network. Even in a case where the configuration of the present example embodiment is applied to the communication system including the plurality of servers that do not correspond to the control plane of the 5G core network, the server to be controlled can establish communication with a server having preferable communication performance in a communication path.

<2.6. First Example Alteration>

In the first example embodiment, in a case where the transmitting/receiving section 110 transmits/receives a signal to/from a connection destination candidate server a plurality of times, the calculating section 120 calculates the simple average of turnaround times (tTAT/bit) per unit data amount in the plurality of transmissions/receptions of a signal to/from the connection destination candidate server. Alternatively, the calculating section 120 may, for example, weight each turnaround time (tTAT/bit) per unit data amount in accordance with an elapsed time since the calculating section 120 calculates the turnaround time (tTAT/bit) per unit data amount, and then calculate the average of the turnaround times (tTAT/bit) per unit data amount.

In this case, the priority determining section 130 may determine a priority for selecting a server to which the server 1 to be controlled is to be connected, based on the average of the weighted turnaround times (tTAT/bit) per unit data amount.

<2.7. Second Example Alteration>

In the first example embodiment, the calculating section 120 calculates the turnaround time per unit data amount between the server 1 to be controlled and each of the servers 3, 4, 5, and 6. Alternatively, for example, the servers included in the communication system 1000A may be grouped into a plurality of server groups, and priorities for selecting a server to which the server 1 to be controlled is to be connected may be determined.

Figure 8:
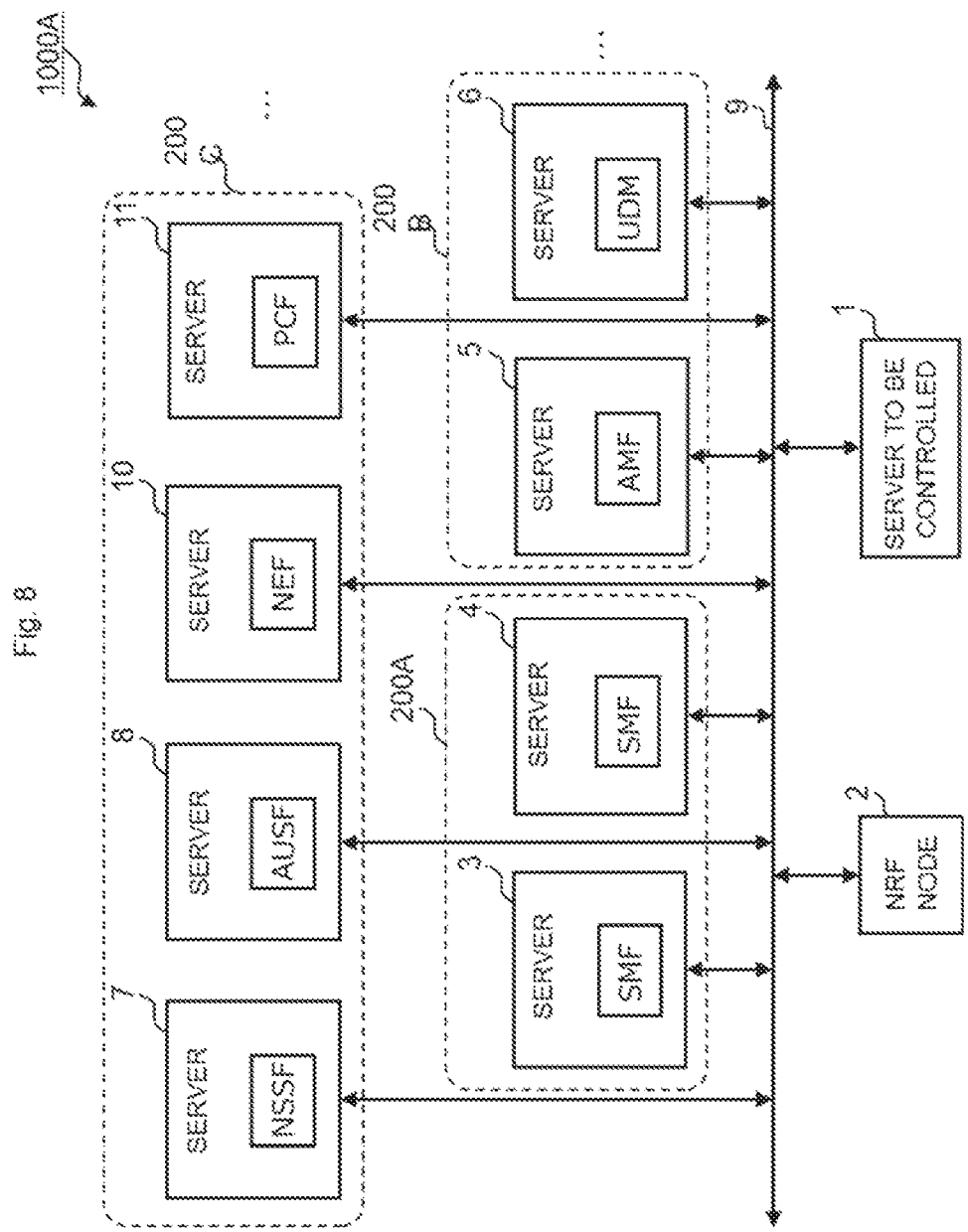
FIG. 8 is a block diagram illustrating an operation configuration of a communication system according to an example alteration of the first example embodiment.

FIG. 8 is a diagram illustrating an overview of a communication system 1000A according to a second example alteration of the first example embodiment. As illustrated in FIG. 8, a first server group 200A includes the server 3 and the server 4. A second server group 200B includes the server 5 and the server 6. A third server group 200C includes the server 7, the server 8, the server 10, and the server 11.

Assume that, in a case where the communication system 1000A includes the first server group 200A, the second server group 200B, and the third server group 200C, the calculating section 120 calculates, for each of the servers 3, 4, 5, and 6, the simple average of turnaround times (tTAT/bit) per unit data amount over a plurality of transmissions/receptions of a signal to/from the server 1 to be controlled, as a transmission rate (refer to FIG. 7).

In such a case, the priority determining section 130 may determine selection information for selecting a server to which the server 1 to be controlled is to be connected, based on (i) the average of the transmission rates that are related to the servers included in the first server group 200A and are calculated by the calculating section 120, and (ii) the average of the transmission rates that are related to the servers included in the second server group 200B and are calculated by the calculating section 120, for example.

In a case of using the transmission rates illustrated in FIG. 7, the average of the transmission rates related to the servers included in the first server group 200A is 5.7875 mS/bit. In the case of using the transmission rates illustrated in FIG. 7, the average of the transmission rates related to the servers included in the second server group 200B is 4.952 mS/bit. In this case, the priority determining section 130 may determine the selection information so as to select one of the servers included in the second server group 200B having smaller transmission rate, in other words, having higher communication performance, than that of the first server group 200A, as the server to which the server 1 to be controlled is to be connected.

Note that, instead of the above, grouping of the servers in the communication system 1000A may group servers that provide the same network function into the same server group, for example. Combinations of servers included in the respective server groups in the communication system 1000A may be dynamically changed according to the configurations and communication performance of the servers.

3. Second Example Embodiment

Next, a description will be given of a second example embodiment of the present disclosure with reference to FIG. 9. The above-described first example embodiment is a concrete example embodiment, whereas the second example embodiment is a more generalized example embodiment. According to the second example embodiment below, similar technical effects to those of the first example embodiment can be exerted.

Figure 9:
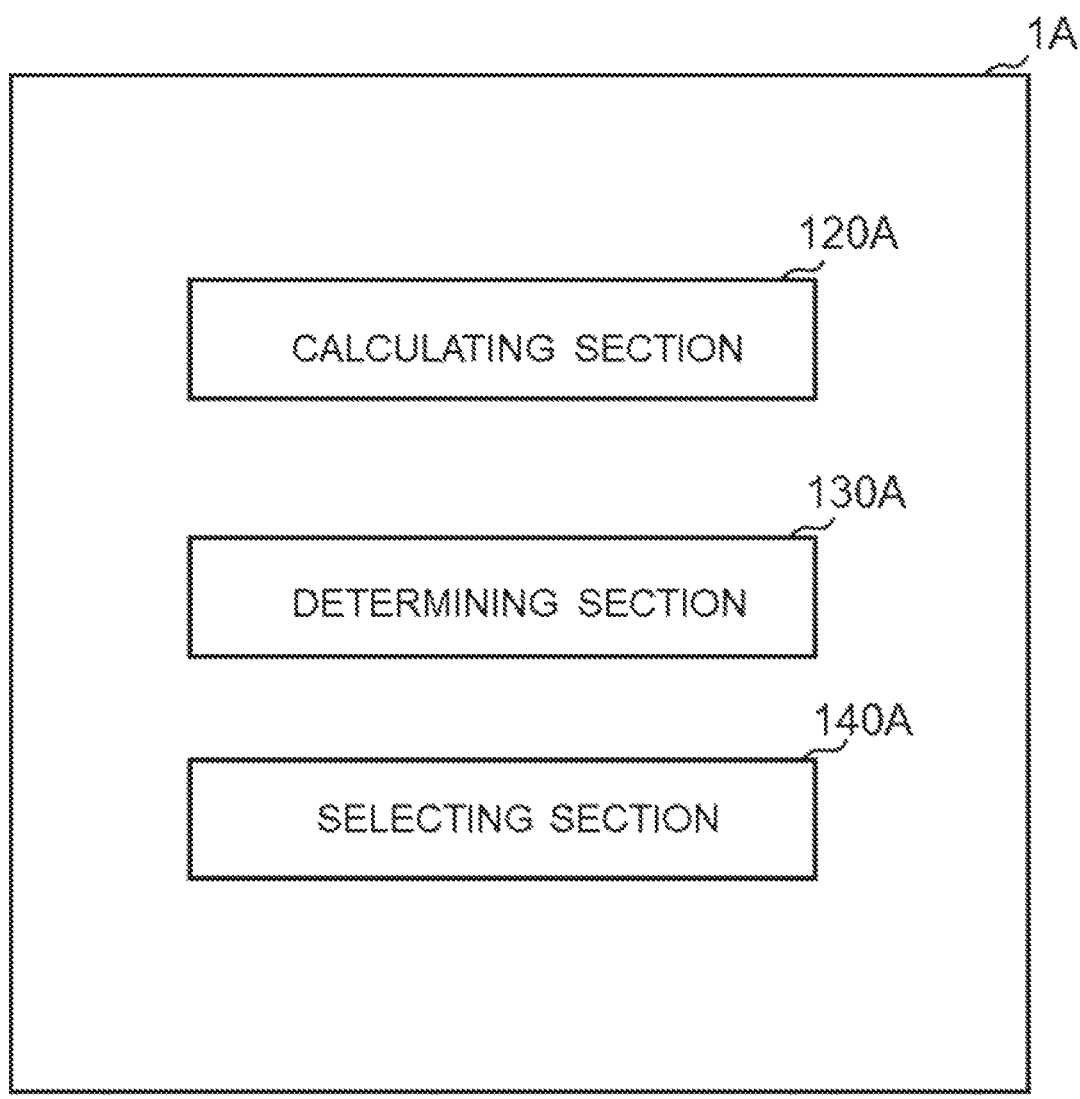
FIG. 9 is a block diagram illustrating an overview of a communication control apparatus according to a second example embodiment.

FIG. 9 is a block diagram illustrating an example of a schematic configuration of a communication control apparatus 1A according to the second example embodiment of the present disclosure. The communication control apparatus 1A includes a calculating section 120A, a determining section 130A, and a selecting section 140A.

The calculating section 120A calculates a turnaround time per unit data amount between a server to be controlled and each of a plurality of servers including other servers different from the server to be controlled. The calculating section 120A calculates the turnaround time, based on a required time from when the server to be controlled starts transmitting a signal to an other server until the server to be controlled receives a response to the signal from such other server, and a data size of the signal.

The determining section 130A determines priorities for selecting a server to which the server to be controlled is to be connected from among the plurality of servers, based on the turnaround times.

The selecting section 140A selects a connection destination server from among the plurality of servers, based on the priorities.

Relationship with First Example Embodiment

As an example, the communication control apparatus 1A according to the second example embodiment may perform the operation of the server 1 to be controlled according to the first example embodiment. In the above case, the configuration and processing of the first example embodiment is also applicable to the second example embodiment. Note that the second example embodiment is not limited to the above-described example.

4. Other Example Embodiments

Descriptions have been given above of the example embodiments of the present disclosure. However, the present disclosure is not limited to these example embodiments. It should be understood by those of ordinary skill in the art that these example embodiments are merely examples and that various alterations are possible without departing from the scope and the spirit of the present disclosure.

For example, the steps in the processing described in the Specification may not necessarily be carried out in time series in the order described in the corresponding flowchart. For example, the steps in the processing may be carried out in an order different from that described in the corresponding flowchart or may be carried out in parallel. Some of the steps in the processing may be deleted, or more steps may be added to the processing.

An apparatus including constituent elements of the server 1 to be controlled described in the Specification (for example, elements corresponding to the calculating section 120, the priority determining section 130, and the connection destination selecting section 140) may be provided. Moreover, methods including processing of the constituent elements may be provided, and programs for causing a processor to execute processing of the constituent elements may be provided. Moreover, non-transitory computer readable recording media (non-transitory computer readable media) having recorded thereon the programs may be provided. It is apparent that such apparatuses, modules, methods, programs, and non-transitory computer readable recording media are also included in the present disclosure.

The whole or part of the example embodiments disclosed above can be described as, but not limited to, the following supplementary notes.

(Supplementary Note 1)

A communication control apparatus including:
  a calculating section configured to calculate a turnaround time per unit data amount between a server to be controlled and each of a plurality of servers including an other server, based on a required time from when the server to be controlled starts transmitting a signal to the other server until the server to be controlled receives a response to the signal from the other server, and a data size of the signal;
  a determining section configured to determine, based on the turnaround time, a priority for selecting from among the plurality of servers a connection destination server to which the server to be controlled is to be connected; and
  a selecting section configured to select the connection destination server from among the plurality of servers based on the priority.

(Supplementary Note 2)

The communication control apparatus according to supplementary note 1, wherein the determining section is configured to determine the priority based on a simple average of the turnaround time calculated within a predetermined time period.

(Supplementary Note 3)

The communication control apparatus according to supplementary note 1, wherein the determining section is configured to
  weight the turnaround time in accordance with an elapsed time since the calculating section calculates the turnaround time, and
  determine the priority based on an average of the weighted turnaround time.

(Supplementary Note 4)

The communication control apparatus according to any one of supplementary notes 1 to 3, wherein
  the plurality of servers include a first server group including a first server and a second server group including a second server different from the first server, and
  the determining section is configured to determine, as the priority, selection information for selecting a server group to which the server to be controlled is to be connected, based on the turnaround time between the server to be controlled and the server included in the first server group and the turnaround time between the server to be controlled and the server included in the second server group.

(Supplementary Note 5)

The communication control apparatus according to any one of supplementary notes 1 to 4, wherein the selecting section is configured to select, as the connection destination server, a server with the turnaround time being the shortest from among the plurality of servers, based on the priority.

(Supplementary Note 6)

The communication control apparatus according to any one of supplementary notes 1 to 5, wherein the server to be controlled and the plurality of servers are network nodes included in a control plane of a 5G core network.

(Supplementary Note 7)

The communication control apparatus according to supplementary note 6, wherein the plurality of servers are the network nodes configured to provide an identical function.

(Supplementary Note 8)

The communication control apparatus according to any one of supplementary notes 1 to 7, wherein the server to be controlled and the plurality of servers are provided in a cloud.

(Supplementary Note 9)

A communication control method including:
 calculating a turnaround time per unit data amount between a server to be controlled and each of a plurality of servers including an other server, based on a required time from when the server to be controlled starts transmitting a signal to the other server until the server to be controlled receives a response to the signal from the other server, and a data size of the signal;
 determining, based on the turnaround time, a priority for selecting from among the plurality of servers a connection destination server to which the server to be controlled is to be connected; and
 selecting the connection destination server from among the plurality of servers based on the priority.

(Supplementary Note 10)

A communication control program causing a processor to execute:
 calculating a turnaround time per unit data amount between a server to be controlled and each of a plurality of servers including an other server, based on a required time from when the server to be controlled starts transmitting a signal to the other server until the server to be controlled receives a response to the signal from the other server, and a data size of the signal;
 determining, based on the turnaround time, a priority for selecting from among the plurality of servers a connection destination server to which the server to be controlled is to be connected; and
 selecting the connection destination server from among the plurality of servers based on the priority.

In a 5G core network, it is possible to establish communication with a server having preferable communication performance in a communication path in a control plane in a 5G core network.

What is claimed is:

1. A communication control apparatus comprising:
 one or more memories storing one or more instructions; and
 one or more processors configured to execute the one or more instructions to:
  calculate a turnaround time per unit data amount between a server to be controlled and each of a plurality of servers including an other server, based on a required time from when the server to be controlled starts transmitting a signal to the other server until the server to be controlled receives a response to the signal from the other server, and a data size of the signal;
  weight the turnaround time in accordance with an elapsed time since the one or more processors calculate the turnaround time;
  determine, based on an average of the weighted turnaround time, a priority for selecting from among the plurality of servers a connection destination server to which the server to be controlled is to be connected; and
  select the connection destination server from among the plurality of servers based on the priority.

2. The communication control apparatus according to claim 1, wherein the one or more processors are configured to determine the priority based on a simple average of the turnaround time calculated within a predetermined time period.

3. The communication control apparatus according to claim 1, wherein
 the plurality of servers include a first server group including a first server and a second server group including a second server different from the first server, and
 the one or more processors are configured to determine, as the priority, selection information for selecting a server group to which the server to be controlled is to be connected, based on the turnaround time between the server to be controlled and the server included in the first server group and the turnaround time between the server to be controlled and the server included in the second server group.

4. The communication control apparatus according to claim 1, wherein the one or more processors are configured to select, as the connection destination server, a server with the turnaround time being the shortest from among the plurality of servers, based on the priority.

5. The communication control apparatus according to claim 1, wherein the server to be controlled and the plurality of servers are network nodes included in a control plane of a 5G core network.

6. The communication control apparatus according to claim 5, wherein the plurality of servers are the network nodes configured to provide an identical function.

7. The communication control apparatus according to claim 1, wherein the server to be controlled and the plurality of servers are provided in a cloud.

8. A communication control method performed by one or more processors and comprising:
 calculating a turnaround time per unit data amount between a server to be controlled and each of a plurality of servers including an other server, based on a required time from when the server to be controlled starts transmitting a signal to the other server until the server to be controlled receives a response to the signal from the other server, and a data size of the signal;
 weighting the turnaround time in accordance with an elapsed time since the one or more processors calculate the turnaround time;
 determining, based on an average of the weighted turnaround time, a priority for selecting from among the plurality of servers a connection destination server to which the server to be controlled is to be connected; and
 selecting the connection destination server from among the plurality of servers based on the priority.

9. A non-transitory computer readable recording medium storing a program executable by one or more processors to perform processing comprising:
 calculating a turnaround time per unit data amount between a server to be controlled and each of a plurality of servers including an other server, based on a required time from when the server to be controlled starts transmitting a signal to the other server until the server to be controlled receives a response to the signal from the other server, and a data size of the signal;
 weighting the turnaround time in accordance with an elapsed time since the one or more processors calculate the turnaround time;

determining, based on an average of the weighted turnaround time, a priority for selecting from among the plurality of servers a connection destination server to which the server to be controlled is to be connected; and selecting the connection destination server from among the plurality of servers based on the priority.

* * * * *